(12) United States Patent
Friedman

(10) Patent No.: US 7,188,847 B1
(45) Date of Patent: Mar. 13, 2007

(54) COLLAPSIBLE CART

(76) Inventor: Neil S. Friedman, 22467 Arcadia Ct., Boca Raton, FL (US) 33433

( * ) Notice: Subject to any disclaimer, the term of this patent is extended or adjusted under 35 U.S.C. 154(b) by 0 days.

(21) Appl. No.: 11/454,022

(22) Filed: Jun. 15, 2006

Related U.S. Application Data

(63) Continuation-in-part of application No. 11/264,991, filed on Nov. 2, 2005.

(51) Int. Cl.
*B62B 1/16* (2006.01)
(52) U.S. Cl. ............................... 280/47.35; 280/47.29; 280/47.19; 280/79.3
(58) Field of Classification Search ............. 280/47.35, 280/47.29, 47.18, 47.19, 47.24, 47.27, 47.28, 280/47.34, 654, 655, 79.3, 33.991, 33.995, 280/33.996
See application file for complete search history.

(56) References Cited

U.S. PATENT DOCUMENTS

| | | | | | |
|---|---|---|---|---|---|
| 2,133,834 | A | * | 10/1938 | Sheldon | 280/47.35 |
| 2,901,262 | A | * | 8/1959 | Berlin | 280/641 |
| 3,052,484 | A | * | 9/1962 | Huffman et al. | 280/654 |
| 4,363,496 | A | * | 12/1982 | Schreiner | 280/47.35 |
| 5,192,092 | A | * | 3/1993 | DiBenedetto | 280/654 |
| 5,435,582 | A | * | 7/1995 | Davidson | 280/33.992 |
| 5,507,507 | A | * | 4/1996 | Davidson | 280/33.991 |
| 5,595,395 | A | * | 1/1997 | Wilson | 280/47.26 |
| D399,625 | S | * | 10/1998 | Murphy et al. | D34/21 |
| 5,845,915 | A | * | 12/1998 | Wilson | 280/47.19 |
| 5,865,449 | A | * | 2/1999 | Castaneda | 280/33.996 |
| 6,024,527 | A | * | 2/2000 | Soriano | 414/345 |
| 6,131,926 | A | * | 10/2000 | Harlan | 280/47.26 |
| 6,454,293 | B1 | * | 9/2002 | Anderson | 280/651 |
| 6,616,152 | B2 | * | 9/2003 | Oliver | 280/47.18 |
| 6,659,476 | B2 | * | 12/2003 | Weida | 280/47.19 |
| 6,843,488 | B1 | * | 1/2005 | Tseng | 280/47.35 |
| 6,929,269 | B2 | * | 8/2005 | Oliver | 280/47.18 |
| 6,932,363 | B2 | * | 8/2005 | D'Angelo | 280/33.991 |
| 6,945,546 | B2 | * | 9/2005 | Guirlinger | 280/47.19 |
| 6,971,654 | B2 | * | 12/2005 | Amsili | 280/47.2 |
| 7,080,844 | B2 | * | 7/2006 | Espejo | 280/33.995 |
| 2003/0001348 | A1 | * | 1/2003 | Weida | 280/47.19 |
| 2005/0012286 | A1 | * | 1/2005 | Woodrow | 280/47.35 |

* cited by examiner

*Primary Examiner*—J. Allen Shriver
(74) *Attorney, Agent, or Firm*—Dale J. Ream

(57) ABSTRACT

A collapsible cart for transporting multiple items includes a horizontal platform with wheels for maneuvering and a rack mounted thereto in an upwardly extending configuration. At least one basket supporting assembly for alternately stowing and deploying at least one basket is attached to the rack. The cart includes a linear actuator for selectively altering the position of the basket along the rack. The cart includes a ramp support coupled to the rack having a ramp for movement between retracted and extended configurations and being pivotal to enable the basket to slide from the basket support assembly to a storage location. The linear actuator may also be utilized to move a basket from a storage location, e.g. a trunk, to the basket supporting assembly.

12 Claims, 16 Drawing Sheets

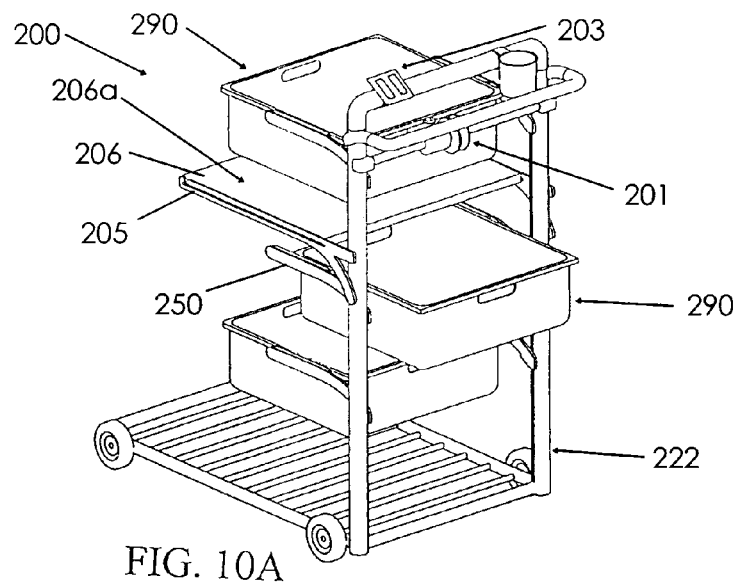
FIG. 10A
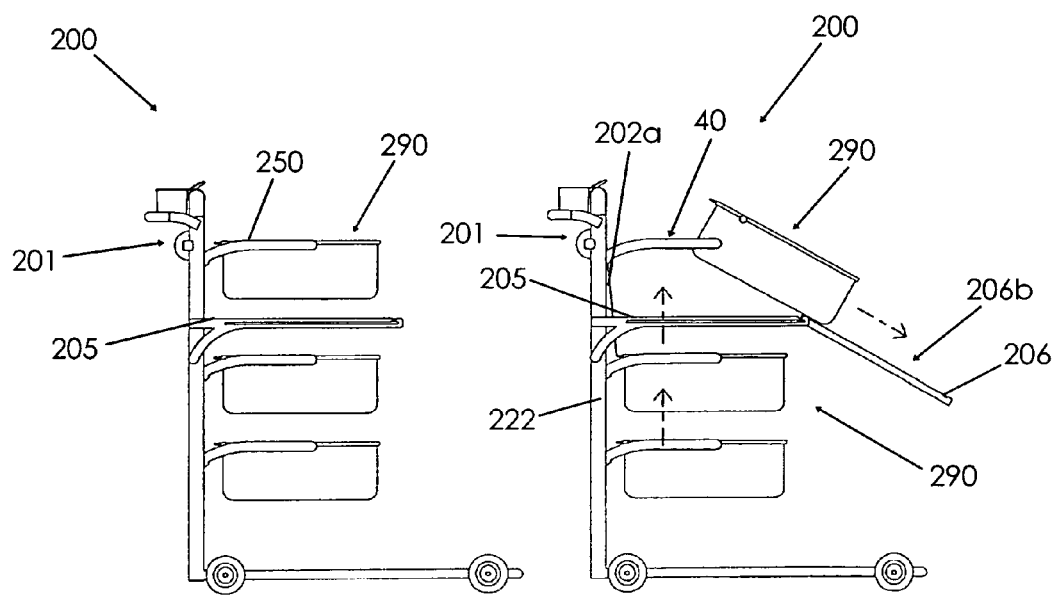
FIG. 10B
FIG. 10C

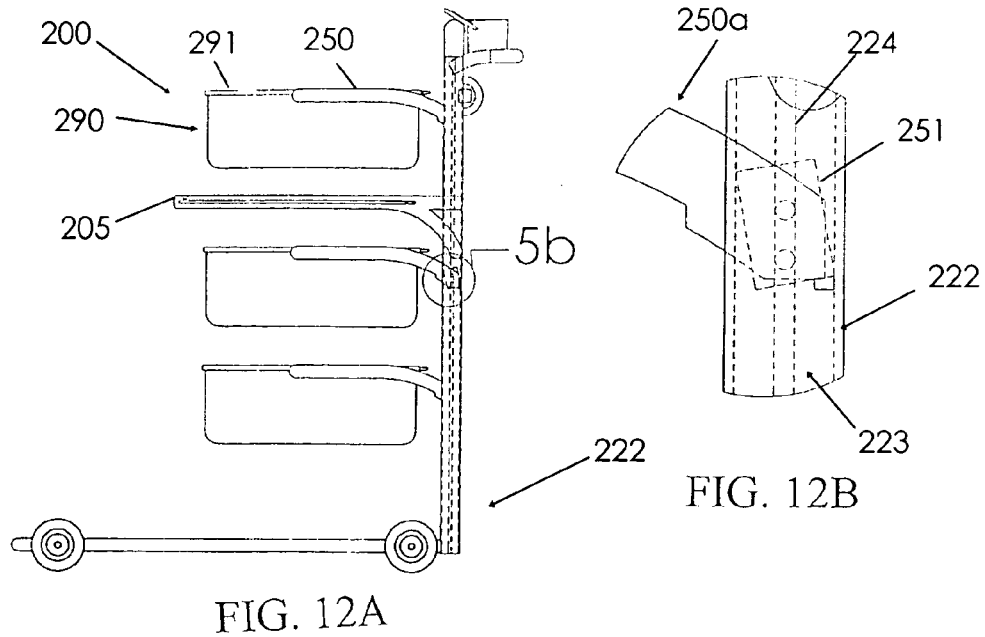
FIG. 12A
FIG. 12B
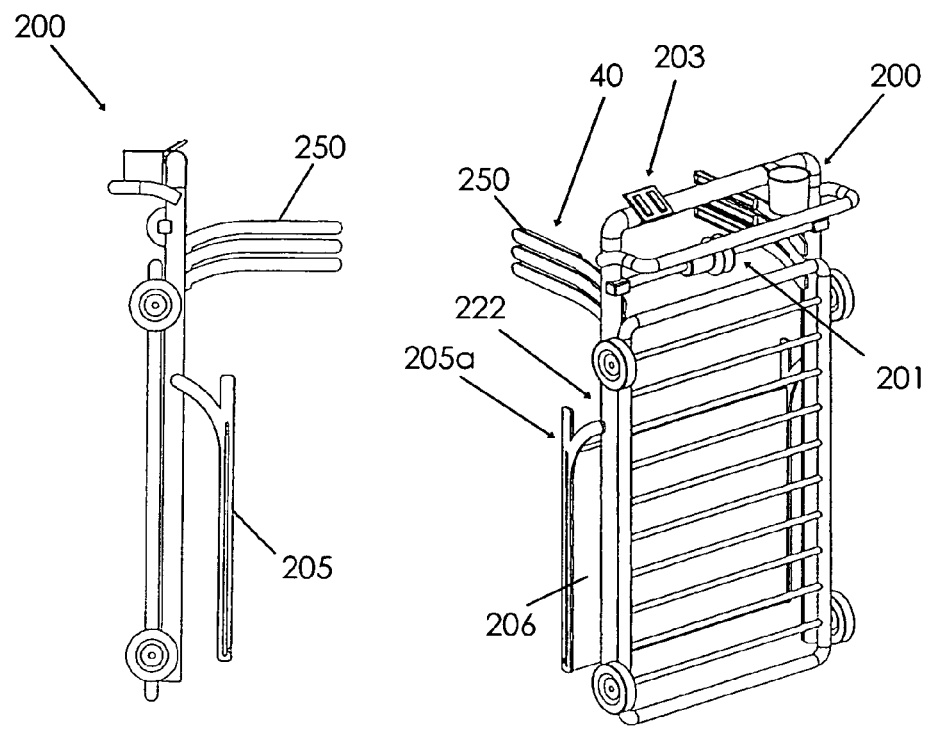
FIG. 12C
FIG. 12D

COLLAPSIBLE CART

CROSS REFERENCE TO RELATED APPLICATIONS

This application is a continuation-in-part of U.S. application Ser. No. 11/264,991 filed Nov. 2, 2005, entitled Collapsible Cart, now abandoned.

BACKGROUND OF THE INVENTION

The present invention generally relates to wheeled carts and particularly to a collapsible wheeled cart for separating, viewing, and transporting multiple items.

Wheeled carts have long been in use for a variety of purposes. A cart bears the weight of a load of items to be carried and frees the hands of a user for other activities. Wheeled carts are frequently used in grocery stores where customers view a large variety of merchandise and may select a relatively large quantity of separate items for purchase. In recent years consumers have favored large multipurpose stores for items such as hardware, clothing, grocery, and other merchandise. Many of these stores offer shopping carts for use by customers while they are in the stores. Customers shopping for groceries, hardware and other products push a cart along as they shop. When an item is selected for purchase, it is placed in the cart. The customer may continue to shop for additional items without the need for hand carrying the items already selected.

Typical shopping carts have the capacity to hold a large quantity of merchandise. Although traditional shopping carts are generally effective for their intended purposes, there are some drawbacks. As a shopping cart becomes filled, the merchandise at the bottom tends to be crushed by the other items. This can be a problem with certain fragile food items such as eggs, bread, and the like. In addition, in stores which offer a wide variety of merchandise, a customer may wish to avoid mixing clothing, food, hardware, and other items. Traditional shopping carts do not have separate compartments to keep these items separated. Additionally, a customer may wish to view the items in a shopping cart to refresh the memory as to which items have already been selected and placed in the cart. When many items have been loaded in a typical shopping cart, it may be difficult to view all of them.

When the customer is finished shopping, he or she pays for all of the merchandise in the cart. After leaving the cashier, the customer may have to hand carry their merchandise to a parked vehicle. Some stores allow the customers to wheel the cart to a loading area or to wheel the cart to the location of the customer's vehicle, where the merchandise is transferred to the vehicle. Once the items have been transferred to a customer's vehicle, the shopping cart must be returned to a storage area of the store.

Therefore, it would be desirable to have a collapsible shopping cart that can be owned by a user carried to and from the store in the user's vehicle. Further, it would be desirable to have a collapsible shopping cart having separate compartments for separating and easily viewing selected merchandise. In addition, it would be desirable to have a collapsible cart having a linear actuator for selectively moving the separate compartments relative to the cart rack or between storage (such as a vehicle trunk) and use configurations (on the cart).

SUMMARY OF THE INVENTION

The present invention is directed to a collapsible, wheeled cart for use in shopping for multiple items of merchandise and for other purposes. The cart of the present invention includes a platform, a rack, a plurality of basket supporting assemblies, and a plurality of baskets. The platform is a horizontally disposed rigid planar structure with a set of rotatable wheels operatively coupled to it. The rack is mounted on the platform in a perpendicular relation and includes means for partial disengagement to allow folding the cart into a collapsed configuration for storage or transport in a vehicle. The rack is formed of rigid members mounted in a spaced apart relation and extending upward in parallel relationship with each other. The cart includes a handle mounted on at least one of the members, for manually propelling and maneuvering the cart.

The basket supporting assemblies are operable for alternately stowing and deploying the baskets. Each one of the basket supporting assemblies includes a pair of rigid upper support arms and a pair of rigid lower support arms. The pair of upper support arms is aligned in a spaced apart parallel relation defining an inside space therebetween, for receiving one of the baskets. Each of the upper support arms is rotatably and slidably attached to a one of the lower support arms to allow cooperative movement.

Attachment means are provided for attaching the basket supporting assemblies to the rack in spaced apart locations. The upper support arms and the lower support arms are provided with upper support arm pivots and lower support arm pivots, respectively. The members are provided with aligned pairs of channels and wells for retaining the upper support arm pivots and the lower support arm pivots respectively. The upper support arm pivots are releasably retained within the channels. The lower support arm pivots are rotatably retained within the wells. Any of the basket supporting assemblies may be grasped from a position at the rear of the cart and manually pulled to release the upper support arm pivots and then slide one of the basket supporting assemblies into a stowed position. Any of the basket supporting assemblies may be deployed by simply pushing the basket forward to engage the channels. The channels and wells are located such that, when deployed, the upper support arms extend horizontally.

The basket supporting assemblies and the baskets are provided with cooperating means for selective release and attachment of the baskets to the basket supporting assemblies. Items may be loaded onto the platform while the basket supporting assemblies and attached baskets are stowed and out of the way. Basket supporting assemblies, with baskets, may be easily deployed and loaded in turn. Also, baskets may be detached from the cart and carried separately, by hand.

In one embodiment of the present invention, a linear actuator may be included for selectively altering the position of one or more baskets along the rack. The actuator may include a winch, rope, and control switch for actuating the winch to move a basket along linear grooves defined by rigid arms of the rack. In addition, a ramp support may be coupled to the rack, is movable between retracted and extended configurations, and includes a ramp that is pivotal such that a basket is slidable thereon from a storage location (e.g. a trunk) to a basket supporting assembly or vice versa.

A general object of the present invention to provide a collapsible cart that can be easily transported to a location in a compact stowed configuration and then unfolded or deployed for use.

Another object of the present invention is to provide a collapsible cart, as aforesaid, having a plurality of baskets that can be stowed until needed and independently deployed and loaded, in turn.

Still another object of the present invention is to provide a collapsible cart, as aforesaid, having a plurality of baskets that can be detached from the cart and hand carried separately.

Yet another object of the present invention is to provide a collapsible cart, as aforesaid, having a linear actuator for selectively moving at least one basket along the rack.

A further object of the present invention is to provide a collapsible cart, as aforesaid, in which the actuator includes a winch, rope, and control switch so that the user can control movement of the baskets between a storage location and basket assemblies on the cart.

A still further object of the present invention is to provide a collapsible cart, as aforesaid, having an extensible ramp support and pivotal ramp for enhancing ease of moving baskets between storage and use configurations.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

The invention will be further understood, by way of example, with reference to the accompanying drawings, in which:

FIG. 10A is another perspective view of the cart as in FIG. 8 with a basket in another configuration.

FIG. 10B is a side view of the cart as in FIG. 8 with the baskets in retracted configurations.

FIG. 10C is another side view as in FIG. 10B with a basket in an extended configuration and being slid along a ramp.

FIG. 12A is another perspective view of the cart as in FIG. 8.

FIG. 12B is an isolated view on an enlarged scale of a portion of the cart as in FIG. 12A.

FIGS. 12C and 12D are side and perspective views of the cart as in FIG. 8 in a collapsed configuration.

DETAILED DESCRIPTION OF THE PREFERRED EMBODIMENTS

A collapsible cart according to the present invention will now be described with reference to FIGS. 1 to 17c of the accompanying drawings. A first embodiment is shown and described with reference to FIGS. 1–7 and is generally directed to a collapsible cart having a plurality of baskets capable of being independently stowed or deployed, and which are capable of being detached from the cart and carried separately.

Figure 1:
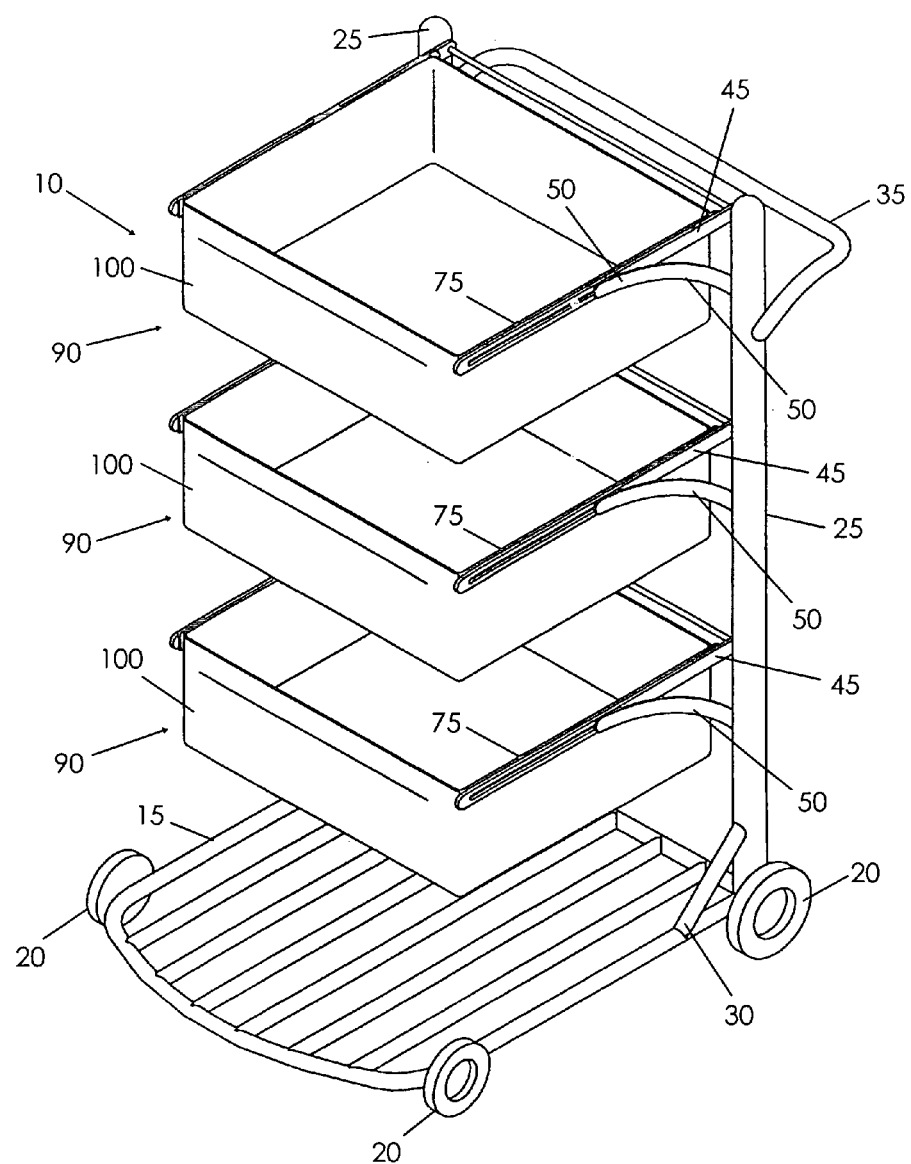
FIG. 1 is a perspective view of the cart according to an embodiment of the present invention.

An embodiment of the collapsible cart shown in FIGS. 1–7 is indicated by reference numeral 10. As shown in FIG. 1, the cart 10 includes a horizontally disposed platform 15 and a set of wheels 20 rotatably mounted on the platform 15. The platform 15 is preferably formed of rigid lightweight material such as aluminum, steel or plastic. The platform 15 may be formed of a solid sheet of material or, alternatively, a plurality of interconnected rungs, as shown in FIG. 1, or a lattice structure, such as a wire mesh, may be used. Wheels 20 may be formed of metal, plastic, or other suitable material and may include a solid rubber tire. The cart 10, of the present invention is shown in FIG. 1, with a set of four wheels 20; however, a tricycle arrangement or other configuration would be suitable. A rack is provided preferably in the form of a pair of rigid members 25 attached perpendicularly to the platform and extending upward in parallel relation. The members 25 may be formed of the same materials, which were named for use in forming the platform 15, and the members 25 may be attached by conventional means such as welding, brazing, or gluing. A pair of angle braces 30 may be added to improve the structural integrity of the cart 10.

It is preferred that the cart 10 is constructed so as to be collapsible. Conventional means, such as a hinged connections (not shown) between the platform 15 and the members 25 or a pair or upstanding sleeves (not shown) attached to the platform 15 and designed to receive the lower ends of the members 25, may be used to allow the members 25 to fold to a horizontal position in alignment with the platform 15, to provide for compact storage of the cart 10.

A handle 35 is attached to at least one of the members 25, as shown in FIG. 1. The handle 35 may be attached by welding, brazing, gluing, or other means to allow a user to manually propel and maneuver the cart 10.

Items may be loaded onto the platform 15, to be transported. A plurality of baskets 90 are included on the cart 10 of the present invention. FIG. 1 depicts a cart 10 with three baskets 90; a lowermost basket, a middle basket and an uppermost basket. However, the present invention, as disclosed herein, is not intended to be restricted to a three-basket arrangement. The present invention includes a plurality of basket supporting assemblies 40 such that one of the basket supporting assemblies 40, as shown in FIG. 2, is included for each of the baskets 90 to be included on the cart 10.

Figure 2:
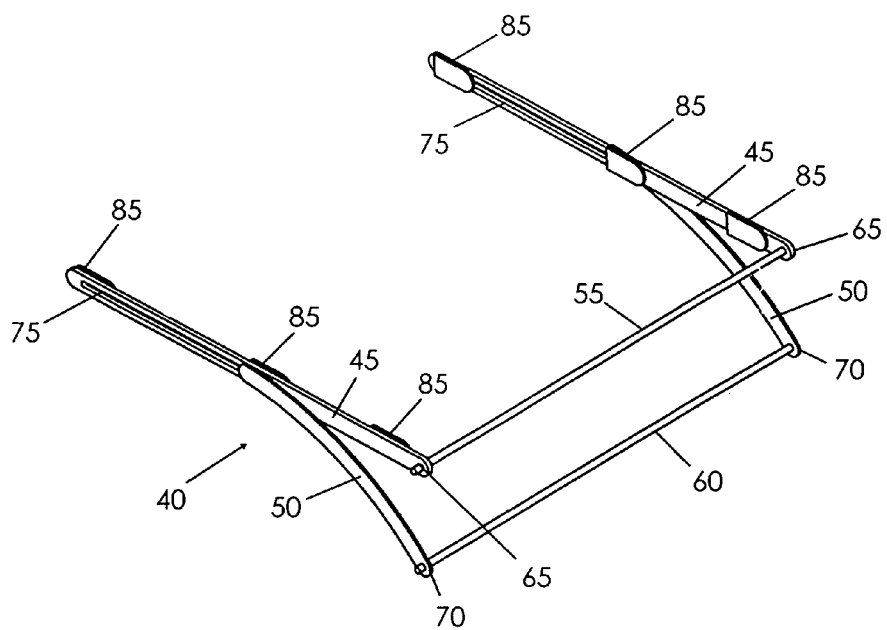
FIG. 2 is a perspective view of the basket supporting assembly of the present invention.
Figure 6:
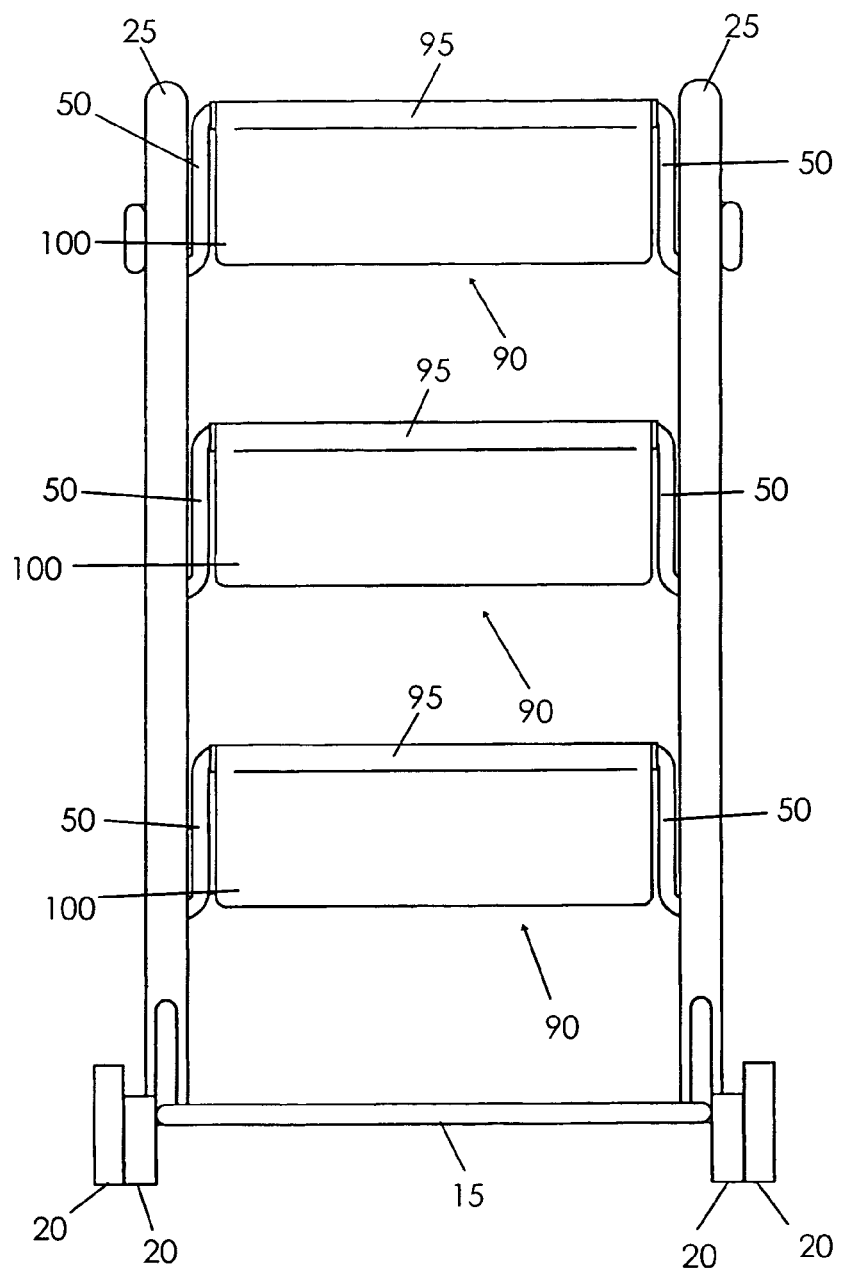
FIG. 6 is a front elevation view of the cart of the present invention.

One of the basket supporting assemblies 40, as shown in FIG. 2, includes a pair of upper support arms 45 and a pair of lower support arms 50. The upper support arms 45 are spaced apart, oriented in a horizontal plane, and aligned in parallel relation, defining an inside space therebetween, such that the pair of upper support arms 45 may be disposed between the members 25. The upper support arms 45 and the lower support arms 50 are preferably formed of rigid steel or aluminum stock having a horizontal thickness of approximately less that 1 centimeter and a greater width. It is intended that the horizontal dimension of the upper support arms 45 and the lower support arms 50 should be minimized in order to maximize the width capacity for the baskets 90, as shown in FIG. 6. The upper support arms 45 and the lower support arms 50 have proximal and distal ends. Each of the upper support arms 45 is provided with a longitudinally extending slot 75 located near the distal end. It is preferred that the slot 75 should extend to a point near to the mid-point of each of the upper support arms 45. Each of the lower support arms 50 is slidably and rotatably secured to one of the upper support arms 45 by a pin attached near the distal end of one of the lower support arms 50 and disposed within the slot 75 of one of the upper support arms 45. The proximal ends of the upper support arms 45 are connected by an upper support arm rod 55, which extends between the upper support arms 45, passes through a hole provided in each of the proximal ends of each of the upper support arms 45, and continues a distance to protrude from the outer aspect of each of the upper support arms 45 to form a pair of upper support arm pivots 65. The connection between the upper support arms 45 and the upper support arm rod 55 may be welded, brazed or glued.

In a like manner, the proximal ends of the lower support arms 50 are connected by a lower support arm rod 60, which extends between the lower support arms 50, passes through a hole provided in each of the proximal ends of each of the lower support arms 50 and continues a distance to protrude from the outer aspect of each of the lower support arms 50 to form a pair of lower support arm pivots 70.

Attachment means are provided for attaching the basket supporting assemblies 40 to the rack. The members 25 may be provided with a plurality of aligned pairs of channels 80 and wells (not shown), for retaining the upper support arm pivots 65 and the lower support arm pivots 70, respectively. The channels 80 are located on the inner aspect of the members 25, extend horizontally, and open toward the rear of the cart 10. One of the pair of channels 80 is located on each of the members 25, and the pair of channels 80 is positioned at equal height. The upper support arm pivots 65 are releasably retained within the channels 80. It is preferred that each of the channels 80 be provided with a releasable retaining clip (not shown), of conventional manufacture, to releasably retain the upper support arm pivots 65 within the channels 80. The lower support arm pivots 70 are rotatably retained within the wells. A pair of plugs (not shown) may be fixed to the lower support arm pivots 70 and the size of the wells may be increased to correspond with the plugs to provide more secure support for the lower support arms 50. It is intended that the upper support arm rod 55 and the lower support arm rod 60 should be of sufficient length to span the distance between the members 25 plus an additional length necessary for the upper support arm pivots 65 and the lower support arm pivots 70 to be received into the channels 80 and the wells, respectively.

Figure 4:
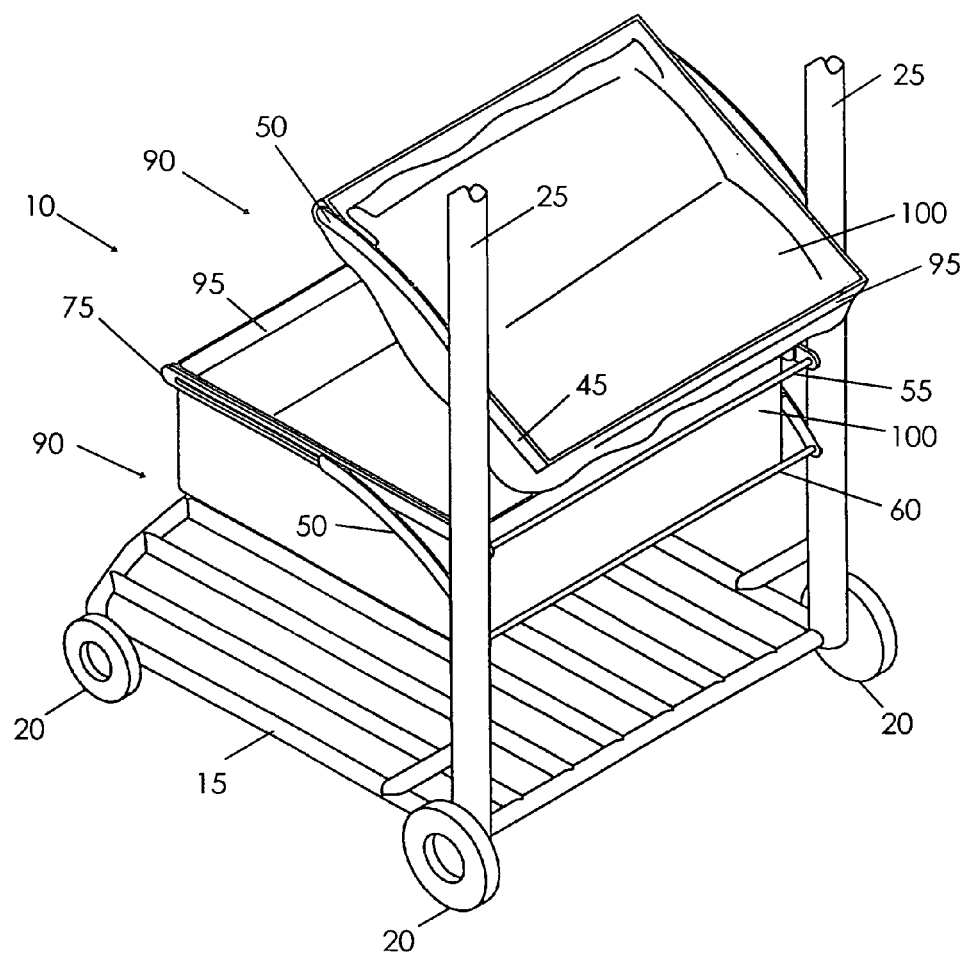
FIG. 4 is a rear perspective view of the cart of the present invention showing a lowermost basket fully deployed and a middle basket partially deployed.

The upper support arm rod 55 may be grasped from a position at the rear of the cart 10, and manually pulled to release the upper support arm pivots 65 and slide one of the basket supporting assemblies 40 into a stowed position, as shown in FIG. 4. Each of the basket supporting assemblies 40 may be deployed by pushing the upper support arm rod 55 forward to engage the channels 80. The channels 80 and the wells are located such that, when deployed, the upper support arms 45 extend horizontally, as shown in FIG. 1.

Figure 5:
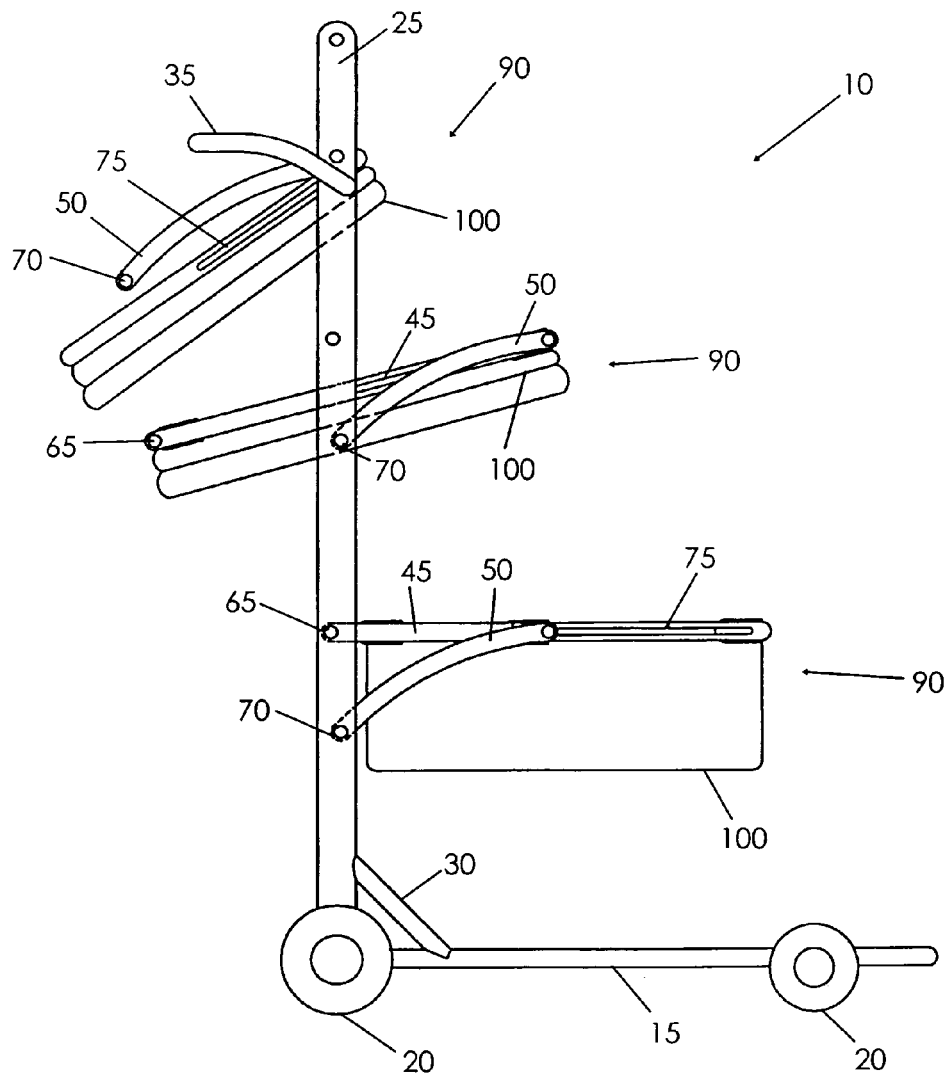
FIG. 5 is a side elevation view of the cart of the present invention showing a lowermost basket fully deployed, a middle basket partially deployed and an uppermost basket stowed.

A version of the present invention is contemplated wherein the lower support arm pivots 70 may also be disengaged so that the basket supporting assemblies 40 may be entirely removed from the cart 10, as depicted by the uppermost basket in FIG. 5. In this alternative version of the present invention, the members 25 are provided with a plurality of pairs of channels on the inner aspect, opening toward the rear of the cart 10, and extending horizontally. One of a first pair of channels is positioned on each of the members 25 and the corresponding one of the first pair is located on the other of the members 25 and positioned at an equal height. A second pair of channels is likewise provided at locations lower than the first pair. Two pairs of channels serve to support each of the basket supporting assemblies 40. It is intended that when the upper support arm pivots 65 are engaged within the first pair of channels, and the lower support arm pivots 70 are engaged within the second pair of channels, the upper support arms extend forward horizontally, as shown in FIG. 1.

In use, the upper support arm rod 55 of one of the basket supporting assemblies 40 may be grasped, manually disengaged from the channels 80, and drawn toward the rear of the cart 10, causing one of the basket supporting assemblies 40 to rotate about the lower support arm pivots 70, and each of the pins, at the distal ends of the lower support arms 50 to traverse the slot 75 toward the distal ends of the upper support arms 55, as shown in FIG. 4. In this manner, one of the basket supporting assemblies 40 may be stowed out of the way of the access path to the platform 15 or another of the baskets 90 located below.

Figure 3A:
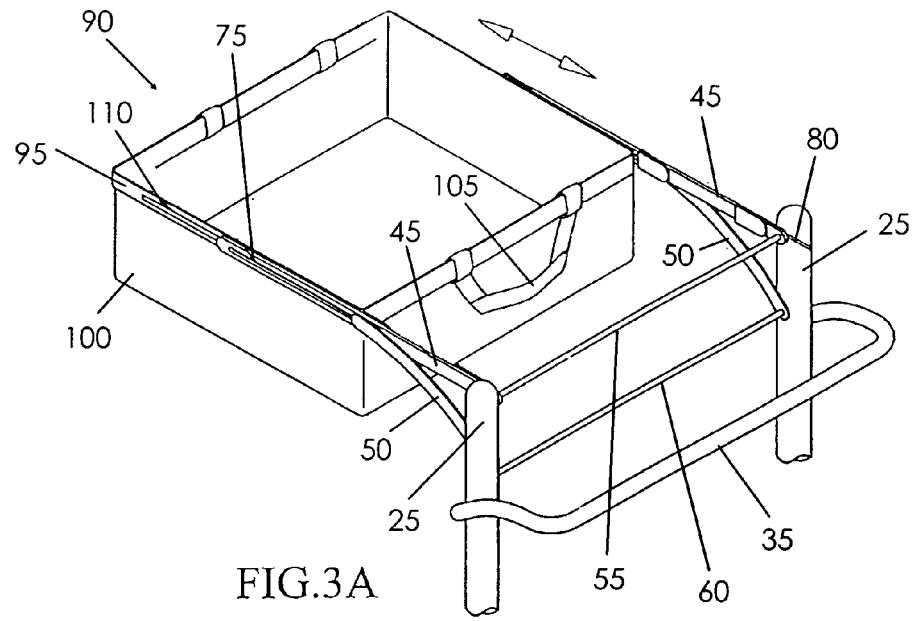
FIG. 3A is a rear perspective view of a basket of the present invention partially installed on a basket supporting assembly with a double-headed arrow showing the direction of movement to manually install or detach the basket.
Figure 3B:
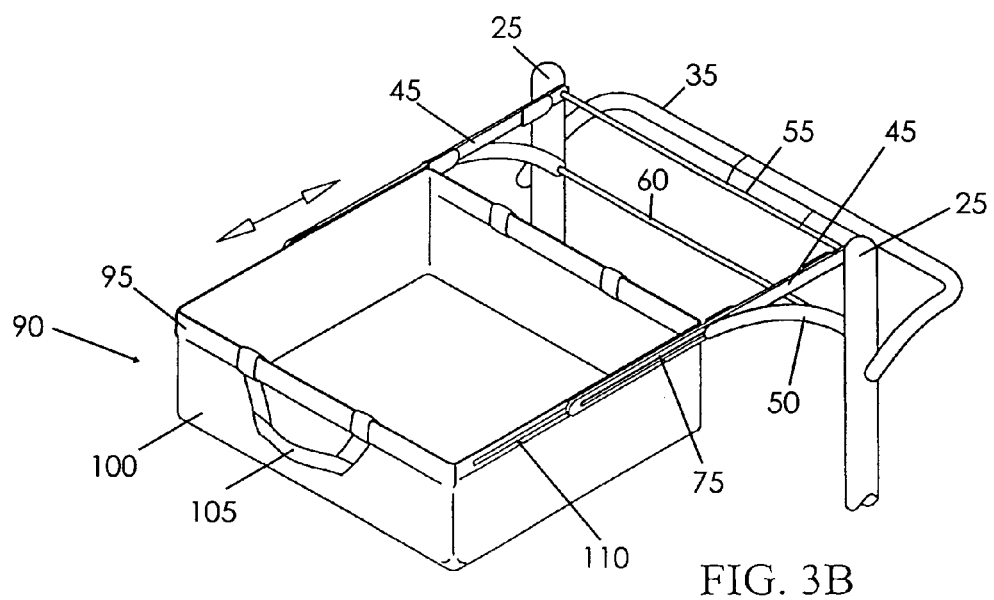
FIG. 3B is another front perspective view of a basket of the present invention partially installed on the basket supporting assembly with a double headed arrow showing the direction of movement to manually install or detach the basket.
Figure 7:
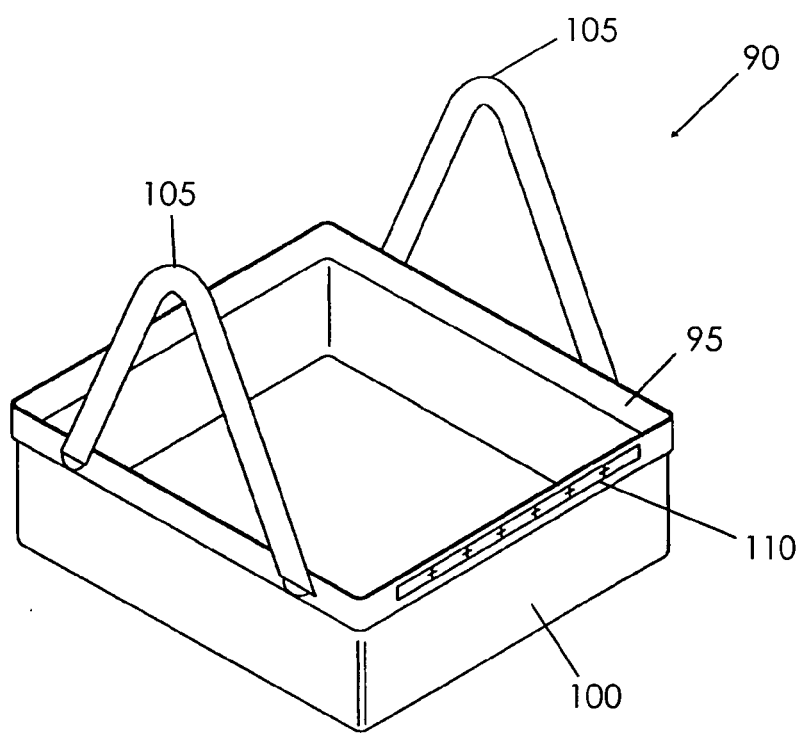
FIG. 7 is a perspective view of a basket of the present invention detached from the basket supporting assembly and ready for use as a hand basket.

It is preferred that the inner aspects of the upper support arms 45 are provided with a plurality of tabs 85 for receiving and retaining baskets 90 as shown in FIG. 2. The tabs 85 are formed in a curved shape having upper and lower flanges. Plastic is a suitable material for forming the tabs 85. Preferably, a plurality of baskets 90 is provided in one-to-one correspondence with the basket supporting assemblies 40. Each of the baskets 90 is formed with a rigid frame 95 of generally rectangular shape. The material used for forming the support arms is also suitable for forming the frame 95. It is intended that at least one horizontal dimension of the frame 95 should be selected to match the inside space between the upper support arms 45, so that a basket 90 may be inserted between a pair of upper support arms 45. Each of the baskets 90 is provided with a receptacle 100 which may be rigid or flexible, as desired. Canvas or other natural or synthetic fabrics are suitable materials for forming a flexible receptacle 100. Plastic or cardboard are suitable for forming a rigid receptacle 100. The baskets 90 are provided with straps 105, for hand-carrying the baskets, and a pair of tracks 110, mounted on opposite sides of the frame 95, for engaging the tabs 85 on the upper support arms 45 to releasably secure the baskets 90 on the upper support arms 45. The tracks 110 are preferably formed of an elongated plastic body having a generally "C" shaped cross section designed to slidably engage the upper and lower flanges on the tabs 85. It is to be understood that the baskets 90 may be hand carried by the straps 105 and used separately from the cart 10, as shown in FIG. 7. The baskets 90 may also be positioned so that the tracks 110 are in alignment with the tabs 85 and manually moved to a fully-engaged position, as shown in FIGS. 3A and 3B. It is also to be understood that the basket supporting assemblies 40 may be stowed, as described above, while the baskets 90 are engaged, as shown in FIGS. 4 and 5.

In order to provide additional convenience, a version of the present invention having a motorized apparatus for deploying the baskets 90 is contemplated. It is preferred that the cart 10 include a battery powered electric motor for driving each of the basket supporting assemblies 40 between stowed and deployed positions. A conventional battery pack (not shown), which may include rechargeable or non-rechargeable batteries, is attached to the rear portion of the platform. A plurality of motorized apparatus is provided in one-to-one correspondence with the basket supporting assemblies 40.

Preferably, each of the motorized apparatus operates one of the basket supporting assemblies 40, and includes a motor mounting plate (not shown) which is rotatably attached to the inner aspect of one of the pair of members 25, at a point below one of the channels 80. The motor mounting plate is provided with an integral portion extending upward adjacent to one of a pair of the upper support arms 45 and having an upper and a lower horizontal extension forming a guide for slidably confining the upper support arms 45. Likewise, a plate, having a shape similar to that of the motor mounting plate, is rotatably attached to the inner aspect of the other of the pair of members 25, at a point opposite the motor mounting plate. Similarly, the plate is provided with an integral portion extending upward adjacent to the other of the said pair of upper support arms 45, and having an upper and a lower horizontal extension forming a guide for slidably confining the other one of the pair of upper support arms 45. It is intended that the upper support arms 45 may slide through the guides while the motor mounting plate and the plate rotate in tandem with the rotation of the lower support arm pivots 70, to maintain a constant spatial relation with the upper support arms 45, as the aforementioned one of the basket supporting assemblies 40 moves between the stowed and the deployed position.

Preferably, each of the motorized apparatus further includes a drive shaft (not shown) spanning the inside space, and supported at each end by being rotatably seated in a bushing provided in the motor mounting plate and the plate, respectively. Each of the pair of upper support arms 45 is provided with a row of teeth (not shown) along the lower edge, and a pair of gears is provided in attached relation on the drive shaft, each of which is sized and configured to mesh with one of the rows of teeth on one of the pair of support arms 45. An electric motor (not shown) is provided and attached to the motor mounting plate with a conventional transmission (not shown) to transfer the motive force from the electric motor to the drive shaft, for turning the drive shaft.

Wiring and a switch (not shown) are provided to supply power from the battery pack to the electric motor. Preferably the switch is a three position toggle switch mounted on the rear portion of a one of the pair of members 25, and configured so as to provide an "Off" position and two "On" positions, for operation of the electric motor in two directions. It is intended that a user would throw the switch to energize the motor and cause one of the basket supporting assemblies 40 to deploy. The user would throw the switch to energize the electric motor in the opposite direction, to stow the one of the basket supporting assemblies 40. It is to be understood that a motorized apparatus and a switch would be provided for each of the basket supporting assemblies 40 such that each of the basket supporting assemblies 40 could be deployed or stowed independently.

A collapsible cart 200 according to still another embodiment is shown particularly in FIGS. 8 to 12D and includes a construction substantially similar to the constructions described above except as specifically noted below.

Figure 8:
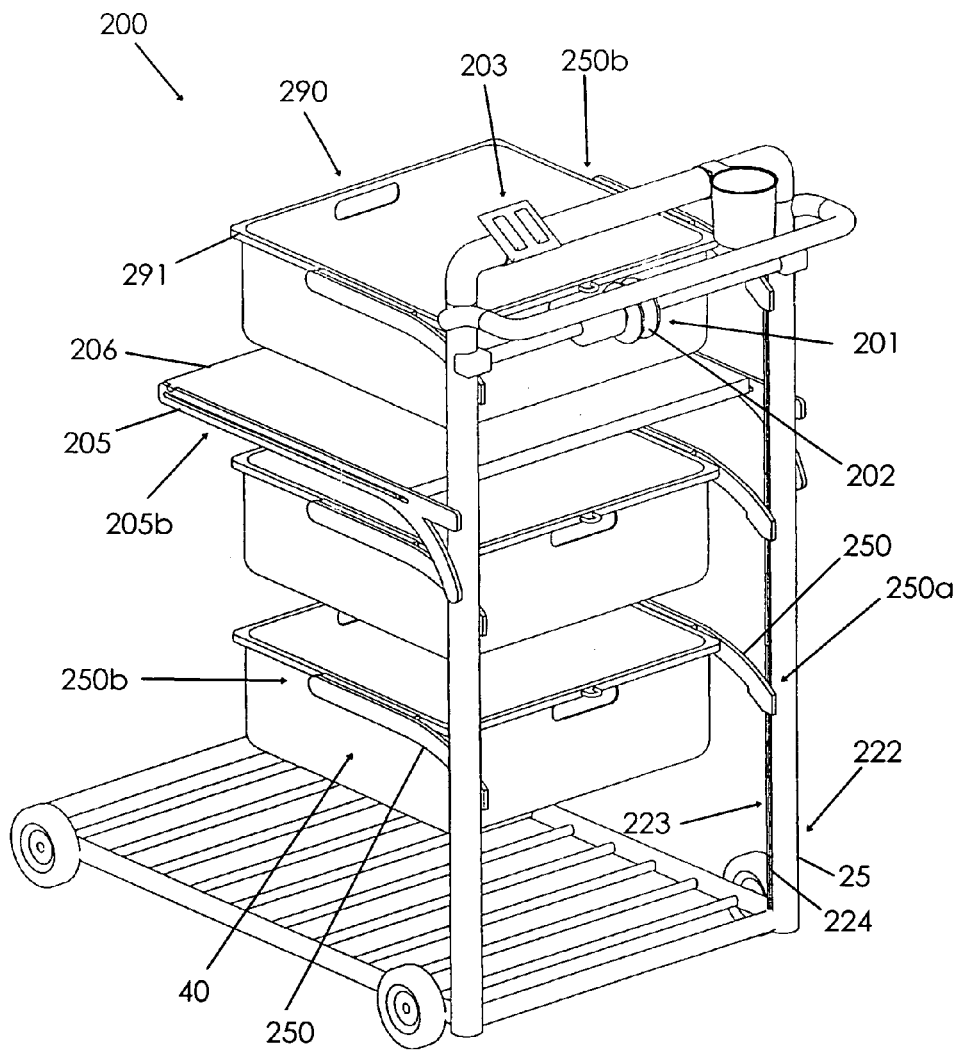
FIG. 8 is a perspective view of a collapsible cart according to another embodiment of the present invention.
Figure 9:
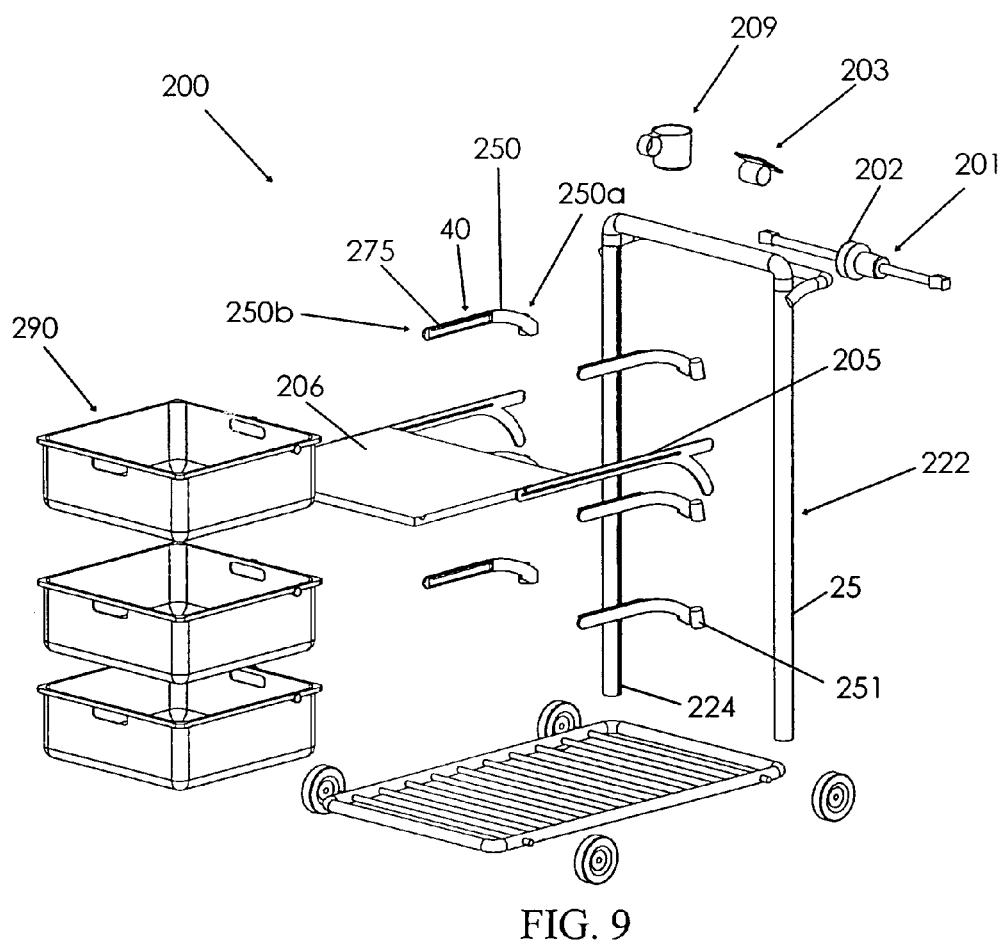
FIG. 9 is an exploded view of the cart as in FIG. 8.

Each basket supporting assembly 40 may include a pair of rigid support arms 250 aligned in spaced apart parallel relation to define an inside space therebetween. Each support arm 250 may have a proximal end 250*a* coupled to rack 222 and a distal end 250*b* defining a longitudinally extending slot 275, as shown in FIG. 9. Attachment means for attaching the basket supporting assemblies 40 to the rack 222 may be included. More particularly, each rigid member 25 of the rack 222 may define an interior hollow area 223 and a linear opening (also referred to as a groove) 224 exposing the interior hollow area 223 (FIG. 12B), and the proximal ends 250*a* may be complementary to the groove 224. As shown in FIG. 12B, the support arm proximal ends 250*a* may extend through the linear openings 224, and each proximal end 250*a* may include a traveler 251 positioned inside a respective interior hollow area 223 for maintaining the support arms 250 generally perpendicular to the rack 222. The baskets 290 may each include a rigid rim 291 cooperable with the longitudinally extending slots 275 to selectively couple the baskets 290 to the support arms 250 (FIG. 8). It should be understood that the rigid rims 291 and the longitudinally extending slots 275 may act cooperatively to selectively release or attach the baskets 290 to the basket supporting assemblies 40.

Means for selectively adjusting a height of at least one basket 290 may be included. More particularly, a linear actuator 201 may selectively alter the position of at least one basket 290 along the rack 222. The linear actuator 201 may, for example, include a winch 202 having rope 202*a*, a gear train (not shown), and/or other actuators. A control device 203 (e.g., a switch) may be in communication with the linear actuator 201 for selectively activating the linear actuator 201. As shown in FIGS. 10C to 11B, the rope 202*a* may be selectively attachable to the baskets 290, respectively.

Figure 11A:
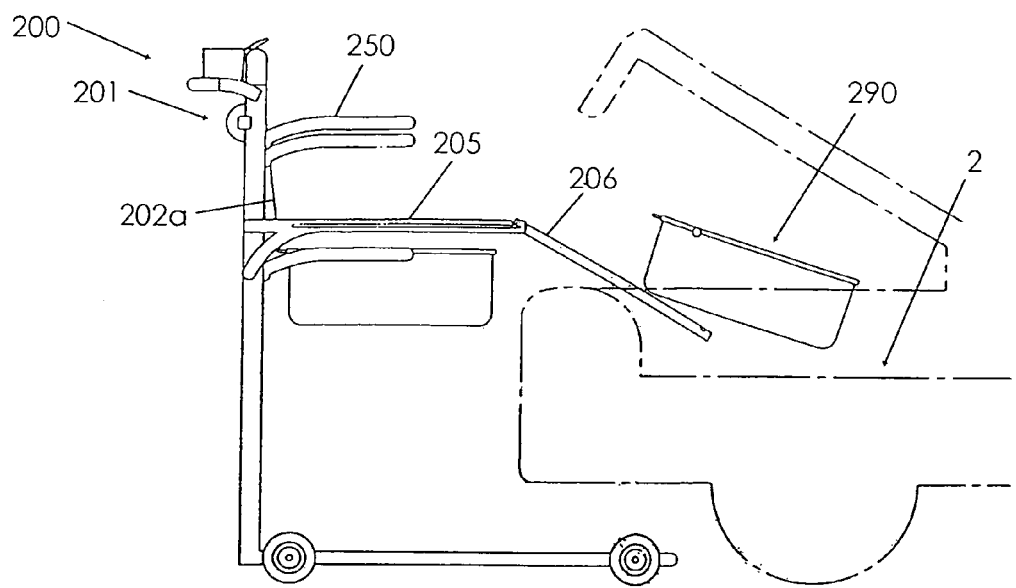
FIG. 11A is another side view as in FIG. 10B with another basket being moved into a storage location.
Figure 11B:
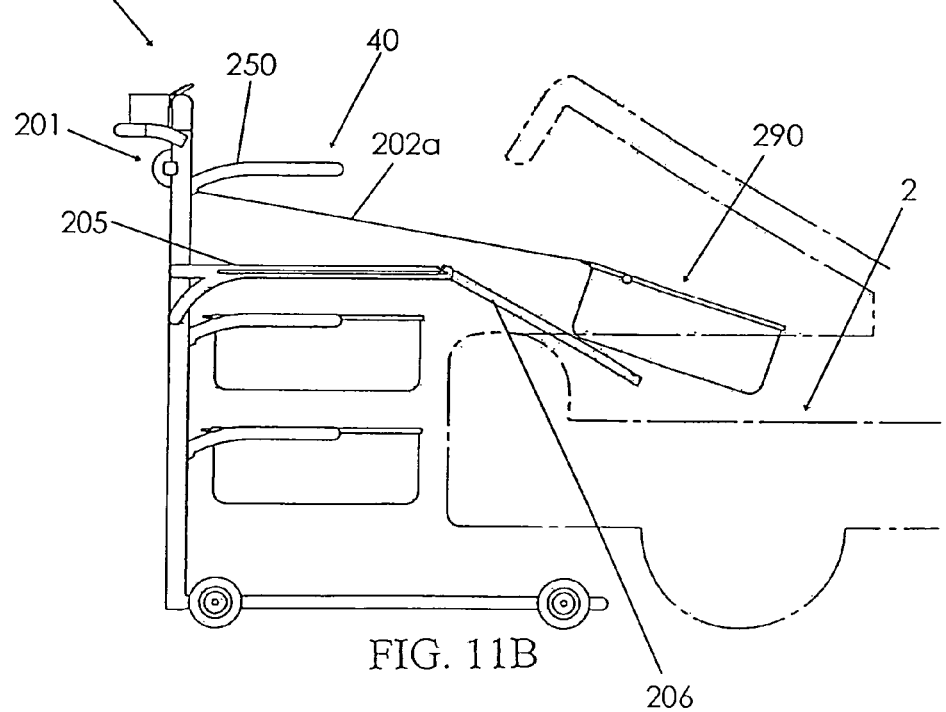
FIG. 11B is another side view as in FIG. 1A illustrating use of the linear actuator with winch pulling a basket from a storage location to a use configuration on the cart.
Figure 13:
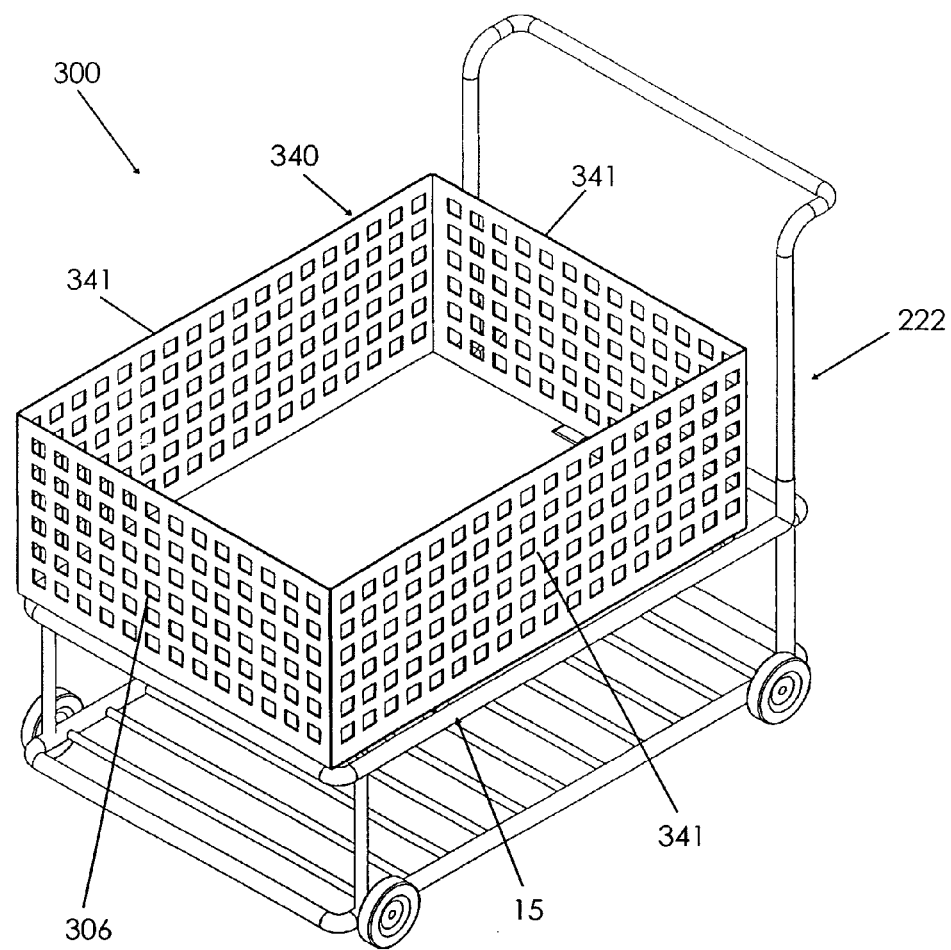
FIG. 13 is a perspective view of a collapsible cart according to yet another embodiment of the present invention.
Figure 14A:
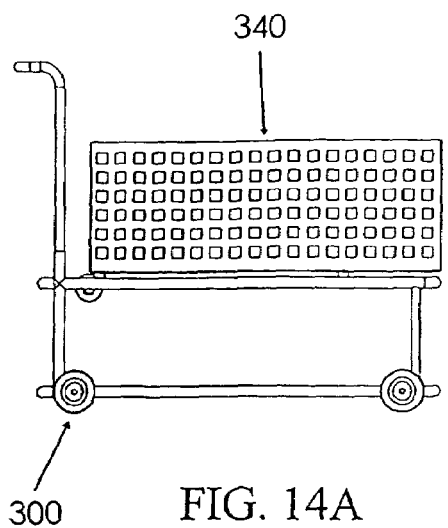
FIG. 14A is a side view of the cart as in FIG. 13.
Figure 14B:
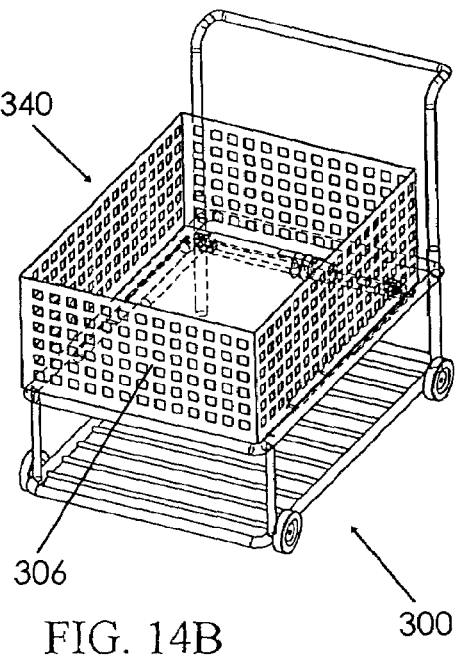
FIG. 14B is another perspective view of the cart as in FIG. 13 in a use configuration.

A ramp support 205 may be coupled to the rack 222, and a ramp 206 may be coupled to the ramp support 205 for movement between a retracted configuration 206*a* (FIG. 10A) and an extended configuration 206*b* (FIG. 10C). The ramp 206 may be pivotable about the ramp support 205 when at the extended configuration 206*b* to selectively slide a basket 290 from the respective basket supporting assembly 40 to a storage location (such as car trunk 2) or to selectively slide a basket 290 from the storage location to a respective basket supporting assembly 40 (FIGS. 11A and 11B). As shown by comparing FIGS. 8 and 12D, the ramp support 205 may be selectively pivotal about the rack 222 between a storage configuration 205a (FIG. 12D) in which the ramp support 205 and the rack 222 are generally parallel and an operative configuration 205b (FIG. 8) in which the ramp support and the rack 222 are generally perpendicular.

As shown in FIG. 8, a cup holder 209 may be coupled to the rack 222 adjacent the handle 35. The handle 35 may be coupled to the rack 222 as described above for operatively propelling and maneuvering the wheels 20 across a floor surface.

In use, the handle 35 may be used to maneuver and propel the cart 200 via the wheels 20. Items may be placed in the baskets 290. To move the baskets 290 to a storage location (e.g., automobile trunk 2), the ramp 206 may be moved to the extended configuration 206b and pivoted downwardly as discussed above (FIGS. 11A and 11B). The rope 202a may be attached to the basket 290 and the control device 203 may be set to allow the rope 202a to extend (FIG. 11B), or the rope 202a may be separated from the basket 290 (FIG. 1A). The basket's rim 291 may then be slid along the longitudinally extending slots 275 to release the basket 291 from the support arms 250 (FIG. 8). The rope 202a may then be coupled to another basket 290, and the linear actuator 201 may raise that basket 290 upon activation by the control device 203 (FIG. 10C). That basket may then be moved to the storage location in a manner similar to that described above, and then another basket 290 may be treated similarly. The attachment means for attaching the basket supporting assemblies 40 to the rack 222 move along the grooves 224 when the linear actuator 201 selectively alters the position of the baskets 290 along the rack 222; the travelers 251 do not obstruct the movement of the support arms 250 relative to the rack 222 upon activation of the linear actuator 201.

A collapsible cart 300 according to still another embodiment is shown particularly in FIGS. 13 to 16C and includes a construction substantially similar to the constructions described above except as specifically noted below.

Figure 15A:
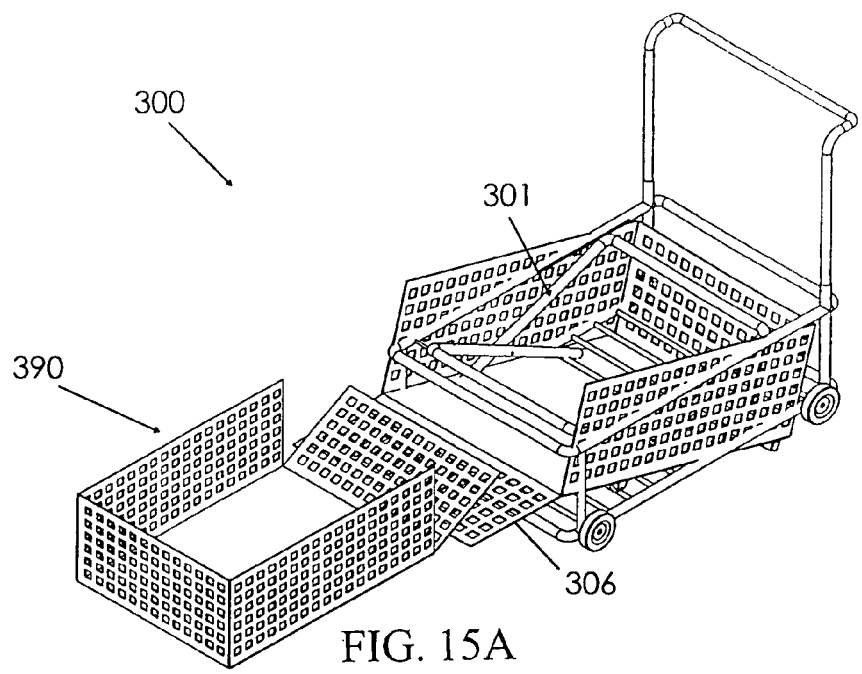
FIG. 15A is another perspective view of the cart as in FIG. 6 with a floor panel removed to show the scissor lift and shown in use with a second container to be utilized in a vehicle trunk.
Figure 15B:
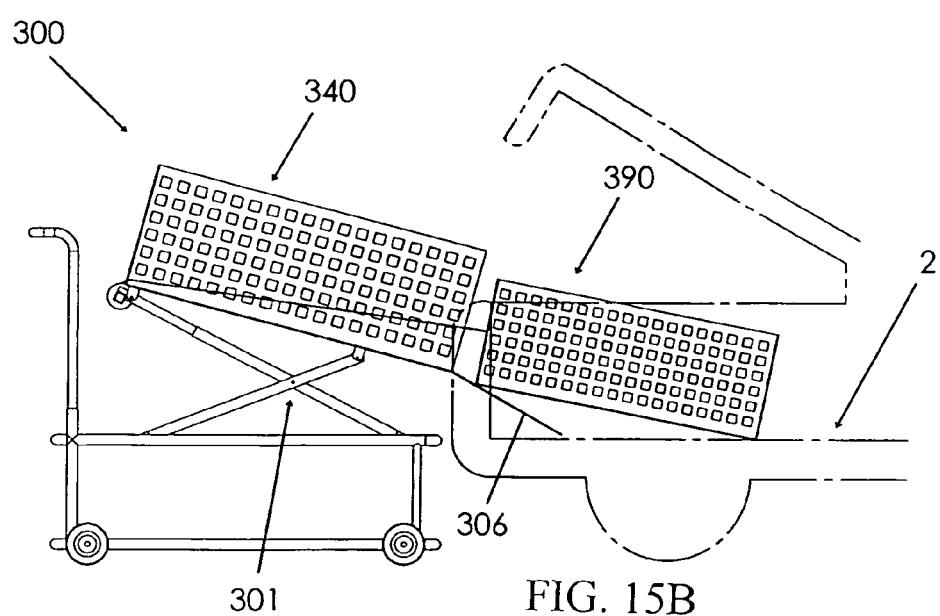
FIG. 15B is a side view of the cart as in FIG. 13 illustrating how the scissor lift of the cart may be operated to a position enabling items therein to be offloaded into the second container as in FIG. 15A and also to illustrate how a winch may be utilized to pull the second container up into the cart during, for instance, an unloading process at a user's residence.

The means for selectively adjusting a height of a basket 390 may include a scissor linkage 301 (FIG. 15B). The basket supporting assembly 340 may be attached to the platform 15 and may include collapsible sidewalls 341 (FIGS. 13 and 16C) operatively coupled to the scissor linkage 301. A pivotable ramp 306 may be coupled to the basket supporting assembly 340.

Figure 16A:
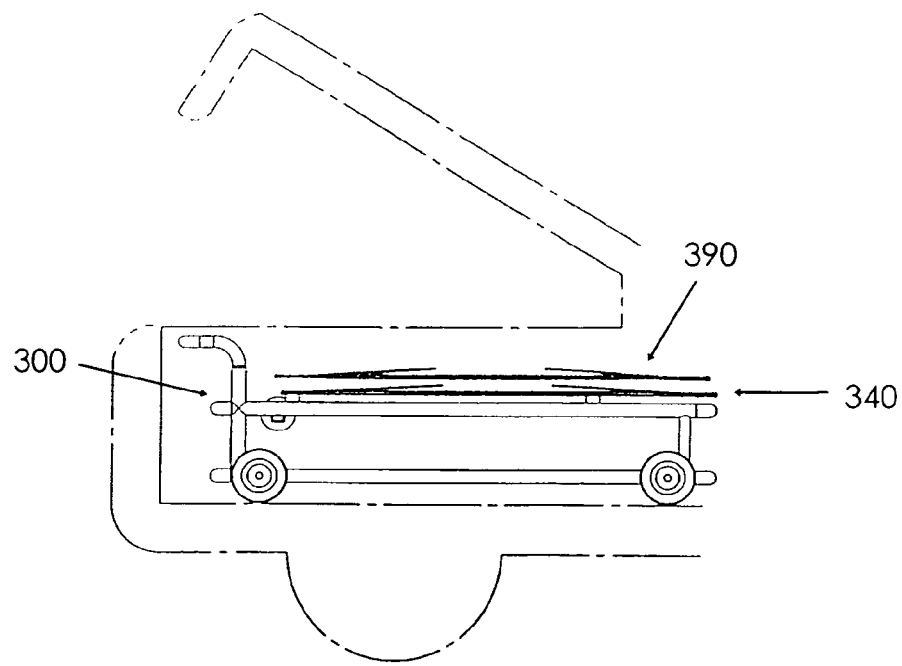
FIGS. 16A–16C are illustrations of the collapsibility and storage of the cart as in FIG. 13.
Figure 16B:
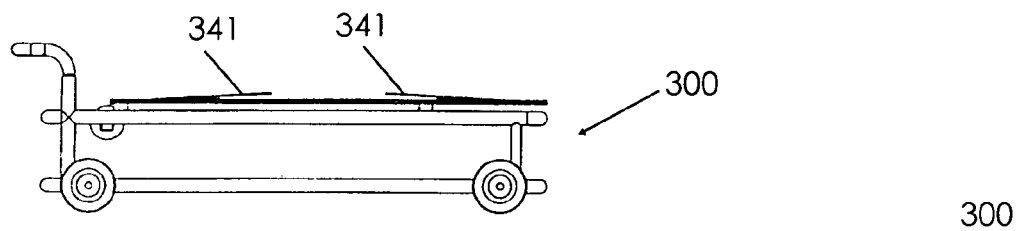
Figure 16C:
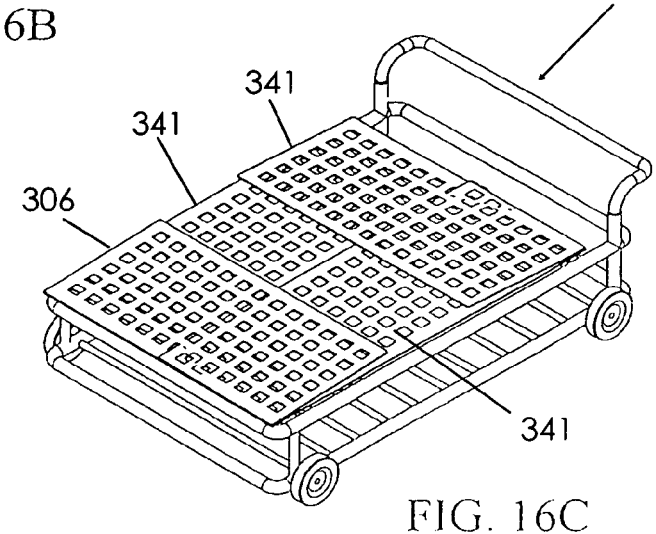

In use, the basket 390 may be supported by or inside the sidewalls 341, and items may be placed in the basket 390. To move the basket 390 to a storage location (e.g., automobile trunk 2), the scissor linkage 301 may be activated to raise the basket 390 and the ramp 306 may be pivoted downwardly as discussed above (FIGS. 15B). The basket 390 may then be slid along the ramp 306 to the storage location. For storage, the sidewalls 341 may be collapsed (FIGS. 16A to 16C), and the cart 300 may be placed in the storage location (FIG. 16A).

Then, a generally reverse process may be undertaken when a user arrives at home and desires to bring the basket full of items into the residence. The cart 300 may be moved into a use configuration and, as shown in FIG. 15B, a winch 310 and rope 311 may be connected to the basket 390 and the basket pulled up the ramp 306 into the basket supporting assembly 340. The cart 300 may then be wheeled into the residence.

It should also be appreciated that the basket supporting assembly 340 may itself include a bottom wall (not shown) such that the basket supporting assembly 340 may itself be filled with items which can then be conveniently offloaded to the basket 390 that may have been previously positioned in a trunk (FIG. 15B).

It is understood that while certain forms of this invention have been illustrated and described, it is not limited thereto except insofar as such limitations are included in the following claims and allowable functional equivalents thereof.

What is claimed is:

1. A collapsible cart for transporting multiple items, said cart comprising:
   a plurality of baskets;
   a plurality of basket supporting assemblies being operable for alternately stowing and deploying said baskets;
   a horizontally disposed rigid platform having a set of rotatably mounted wheels attached thereto;
   a rack mounted on said platform in generally perpendicular relation and having attachment means for attaching said basket supporting assemblies to said rack;
   a linear actuator to selectively alter the position of at least one said basket along said rack;
   a ramp support coupled to said rack; and
   a ramp coupled to said ramp support for movement between retracted and extended configurations.

2. The collapsible cart as in claim 1, wherein said ramp support is selectively pivotal about said rack between a storage configuration in which said ramp support and said rack are generally parallel and an operative configuration in which said ramp support and said rack are generally perpendicular.

3. The collapsible cart as in claim 1, wherein said ramp is pivotal about said ramp support when said ramp is at said extended configuration to selectively slide a respective said basket from said respective basket supporting assembly to a storage location.

4. The collapsible cart as in claim 1, wherein said basket supporting assemblies and said baskets have cooperative means for selective release and attachment of said baskets to said basket supporting assemblies.

5. The collapsible cart as in claim 1, further comprising a control device in communication with said linear actuator for selectively activating said linear actuator.

6. The collapsible cart as in claim 1, wherein said linear actuator includes a winch.

7. The collapsible cart as in claim 6, wherein:
   said winch includes a rope, said rope being selectively attachable to said baskets, respectively; and
   said basket supporting assemblies and said baskets have cooperative means for selective release and attachment of said baskets to said basket supporting assemblies.

8. The collapsible cart as in claim 1, wherein:
   said rack defines a groove;
   said attachment means for attaching said basket supporting assemblies to said rack are complementary to said groove; and
   said attachment means for attaching said basket supporting assemblies to said rack move along said groove when said linear actuator selectively alters the position of said baskets along said rack.

9. The collapsible cart as in claim 1, wherein:
   said platform includes a generally rectangular shape having a front portion and a rear portion;
   said rack comprises a pair of rigid members mounted on said rear portion of said platform in spaced apart relation and extending upward in generally parallel relation with each other;

each said basket supporting assembly comprises a pair of rigid support arms aligned in spaced apart parallel relation to define an inside space therebetween;

each said support arm has a proximal end coupled to said rack and a distal end defining a longitudinally extending slot; and each said basket includes a rigid rim cooperable with said longitudinally extending slots to selectively couple said baskets to said support arms.

10. The collapsible cart as in claim 9, wherein:

each said rigid member of said rack defines an interior hollow area and a linear opening exposing said interior hollow area;

said support arm proximal ends extend through said linear openings exposing said interior hollow areas; and said each said support arm proximal end includes a traveler positioned inside said respective interior hollow area for maintaining said support arm generally perpendicular to said rack, said traveler not obstructing movement of said support arm relative to said rack upon activation of said linear actuator.

11. The collapsible cart as in claim 9, wherein:

each said basket includes a rigid horizontally-oriented frame having a generally rectangular shape, said frame being sized such that at least one dimension is complementary to the dimension of said inside space between a said pair of support arms; and each said basket includes a receptacle attached to a respective said frame, said receptacle extending downward therefrom for receiving one or more of said items.

12. The collapsible cart as in claim 1, further comprising:

a handle coupled to said rack for operatively propelling and maneuvering said wheels across a floor surface; and a cup holder coupled to said rack.

* * * * *